April 16, 1940.  R. H. ALLEN  2,197,603
WATER HEATING UNIT
Filed Jan. 29, 1938   3 Sheets-Sheet 1
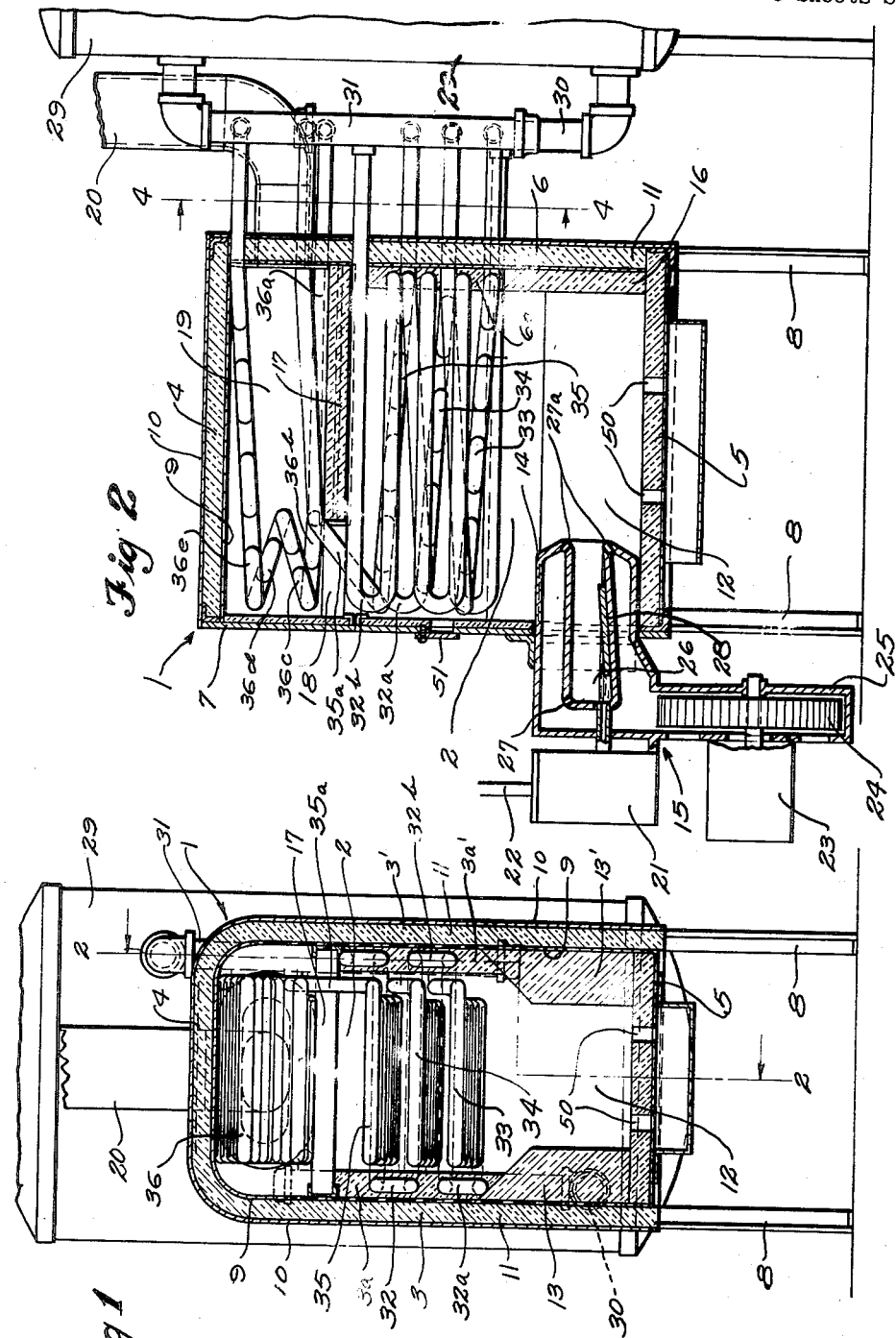
INVENTOR
R. H. ALLEN
BY
Cook & Robinson
ATTORNEY April 16, 1940.    R. H. ALLEN    2,197,603
WATER HEATING UNIT
Filed Jan. 29, 1938    3 Sheets-Sheet 2
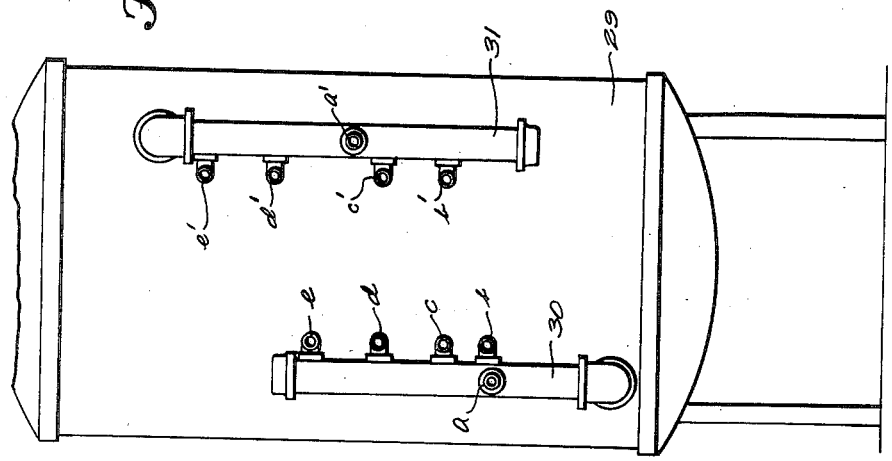
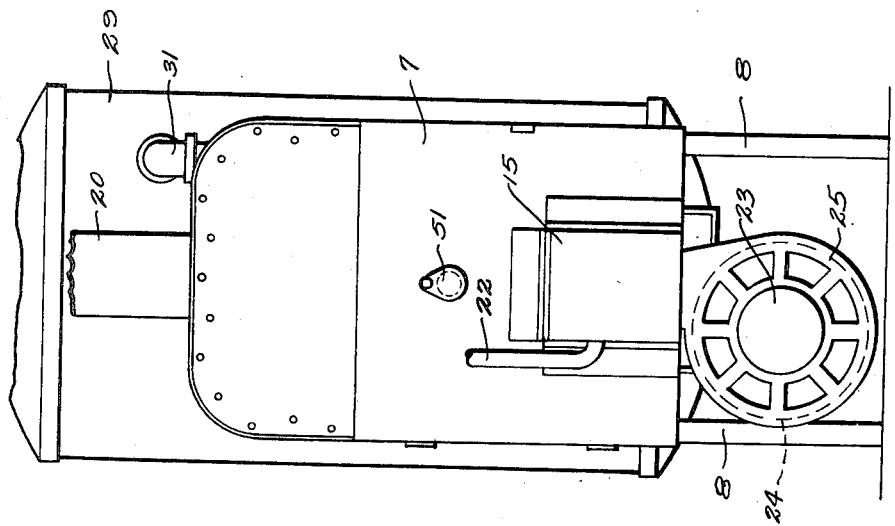
INVENTOR
R. H. ALLEN
BY
Cook & Robinson ATTORNEYS April 16, 1940.　　　　　R. H. ALLEN　　　　　2,197,603
WATER HEATING UNIT
Filed Jan. 29, 1938　　　　　3 Sheets-Sheet 3
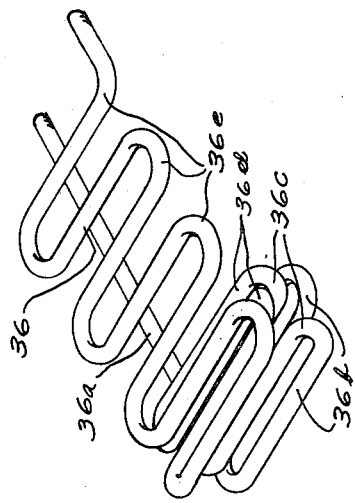
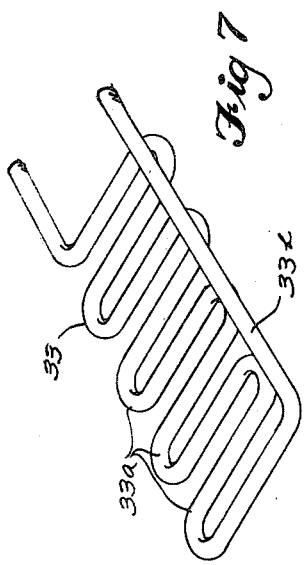
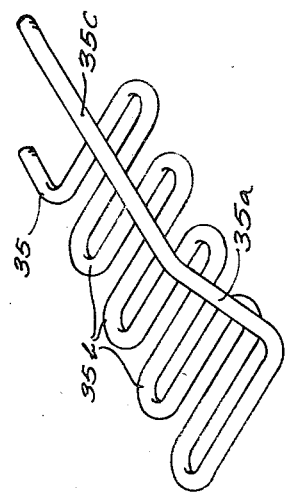
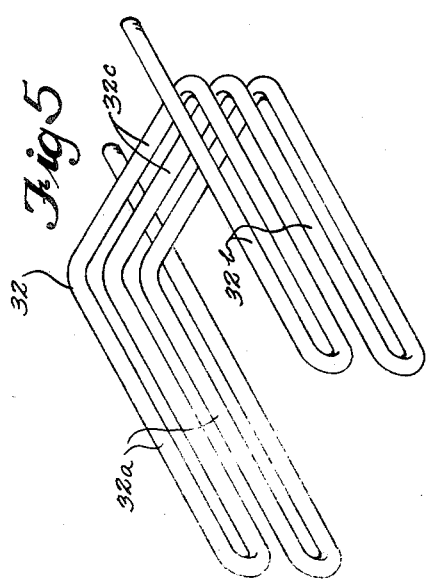
INVENTOR
R. H. ALLEN
BY
Cook & Robinson ATTORNEYS Patented Apr. 16, 1940

2,197,603

UNITED STATES PATENT OFFICE 2,197,603

WATER HEATING UNIT

Roy H. Allen, Seattle, Wash.

Application January 29, 1938, Serial No. 187,672

3 Claims. (Cl. 122—279)

This invention relates to improvements in heaters for the production of steam or hot water, and it has reference more particularly to a heater wherein the water to be heated is conducted into the heating chamber through a plurality of coils of copper tubing; it being the principal object of this invention to provide an arrangement of coils whereby the greatest possible heat efficiency is obtained from the burning fuel; to provide a heater housing that conserves, to the maximum degree, the heat of combustion, and which so contains the coils that the heating of water is expedited to the greatest extent; also, to provide an assembly of parts which makes possible an easy removal and replacement of any one of the pipe coils without interfering with use of any other.

Still other objects of the invention reside in the details of construction, and in the combination of parts, as will hereinafter be fully described.

In accomplishing these objects, I have provided the improved details of construction, the preferred forms of which are illustrated in the accompanying drawings, wherein—

Fig. 1 is a cross sectional view, in a vertical plane, of the present heating unit, particularly illustrating the disposition of the several coils in the heater housing.

Fig. 2 is a longitudinal section of the unit, as seen on the line 2—2 in Fig. 1.

Fig. 3 is a front elevation of the heating unit.

Fig. 4 is a cross sectional view on the line 4—4 in Fig. 2.

Figs. 5, 6, 7 and 8, respectively, are perspective views of the various types of coils employed.

Referring more in detail to the drawings—

1 designates, in its entirety, the furnace or heater, within which the pipe coils are contained; this being of sheet metal construction and lined with insulating material, as presently described, forming a furnace chamber 2.

As seen best in Figs. 1 and 2, the housing has opposite side walls 3—3', merging in rounded corners into a top wall 4. There is also a bottom wall 5, composed of a refractory material, such as fire brick, a back wall 6 and a front wall 7, all solidly united in a metal frame structure supported by corner legs 8 of angle iron, as illustrated. These walls, as will be observed by reference to Figs. 1 and 2, are composed of inside and outside linings 9 and 10 of sheet metal, between which is a filler of corrugated asbestos sheets 11, or other suitable insulating material.

Formed in the bottom portion of the housing is a combustion chamber 12 that extends lengthwise of the housing between two relatively heavy blocks of refractory material 13—13', such as fire bricks, which are disposed upon the bottom wall and against the opposite side walls.

The blast tube 14 of an oil burner 15, of a suitable kind for heating the chamber 2, extends through an opening in the front wall into the chamber. A slab of insulating fire brick 16 is disposed against the back wall to protect it against the extreme heat of the flame blast delivered by the burner, and this extends upwardly to a horizontal baffle 17 which is spaced down from the top and terminates short of the front wall, leaving a passage 18 into a top chamber 19 from which a stack 20 leads.

The oil burner here illustrated is of the conventional type, having a variable constant level float system in a housing 21, connected by a pipe line 22 to a source of oil supply, not shown, and a motor 23 operating a fan 24 in the fan housing 25. Air is forced into the vaporizing chamber 26 by the fan through a plurality of air ports 27, which mixes with the oil vapor and carries it out into the combustion chamber 12. Air is also forced into the combustion chamber through a plurality of air ports 27a, where it mixes with the oil vapor from the vaporizing chamber 26 and supports the combustion at this point.

The oil in the burner vaporizing chamber 26 is initially ignited by a piece of burning paper or cloth saturated in the oil, and the fan started when the temperature of the side walls and plate is high enough to cause vaporization of the oil therein. The metal plate 28 is of a type of metal that dissipates its heat quite readily to the oil that it is in contact with. While the burner is in operation, the heat for vaporization is conducted to this plate by the metal of the burner itself.

The container, tank, or the like, for storing the hot water or steam produced by the heater, is indicated at 29, and this may be a tank of the kind shown, or of any other suitable form. Connected therewith are two vertical pipe headers 30 and 31, designated, respectively, as the cold water header and the hot water header; the hot water header being connected into the tank at its upper end and the cold water header having a connection at its lower end into the tank at a substantially lower level than the hot water connection. This tank is located back of the heater as seen in Fig. 2.

Located within the heater are the pipe coils, which have been individually shown in Figs. 5, 6, 7 and 8. The outer coil 32, shown in Fig. 5, is comprised of a single continuous pipe that is bent in a series of loops 32a to lie in a vertical plane spaced slightly inward from the side wall 3, another series of loops 32b in a vertical plane spaced slightly inward from the other side wall 3', and a series of cross pipes, as at 32c, spaced slightly inward from the back wall 6, which connect the loops 32a and 32b so that together they provide for a natural and continuous circulation of water through the loops, back and forth from side to side of the furnace. The ends of the pipe forming this coil are extended through the back wall of the housing and are connected with the headers 30 and 31, as seen at a—a' in Fig. 4, respectively. This provides that the cold water enters at the lower level, and with the rise in temperature, circulates through the coil 32 to the tank 28.

The top edges of the fire brick 13—13' along the sides of the chamber 12 are sloped outwardly and upwardly to give more width to the chamber immediately above the combustion area. It will be noted that the outer coil 32 is enclosed in a layer of refractory material such as fire clay in the side and rear walls, and at 3a, 3a' and 6a, this being applied in plastic state after the coil 32 is fitted in place, and then allowed to harden.

The coils 33, 34, 35 and 36, as seen in Figs. 6, 7 and 8, are so disposed at different levels in the furnace chamber 2, and just above the combustion chamber 12, as to be directly contacted by the blast flame and hot vapors of combustion from the oil burner. The coils 33 and 34 are identical and will be illustrated and described once herein. The coil 35 varies in construction from coils 33 and 34 insofar as it has a rise 35a that leads out of the combustion chamber, to the hot water header 31, through the chamber 19 above the baffle 17. The coil 36 is of such construction that it is contacted by the hot gases of combustion as they pass from the furnace chamber 2 to the upper chamber 17 through the passage 18.

By referring to Figs. 1, 2 and 7, it will be seen that the coil 33 consists of a series, or plurality, of back and forth loops 33a, lying in a plane slightly inclined from the point of entrance into the furnace chamber 2 at the rear of the unit, to the front thereof, from whence a return pipe 33b extends rearwardly, also in a slightly inclined plane. The ends of this coil are connected with the cold and hot water headers 30 and 31, respectively, at b—b'. Coil 34 will be connected to the cold and hot water headers 30 and 31 at c—c', respectively.

The coil 35, as seen in Figs. 1, 2 and 6, consists of a series or plurality of back and forth loops 35b, also lying in a plane slightly inclined from the point of entrance to the front of the furnace chamber 2, in the same manner as coils 33 and 34, and the rise 35a provides that the return pipe 35c, which is also inclined slightly, will lie above the baffle 17. The ends of this coil connect with the cold and hot water headers 30 and 31 at d—d' respectively.

The coil 36, as seen in Figs. 1, 2 and 8, consists of a straight lead 36a from the point of entrance directly to the passage 18 between the furnace chamber 2 and the upper chamber 19, and a series, or plurality, of coils 36b—36c and 36d are laid in planes inclined to a medium degree with reference to each other, and extend from the outer edge of the baffle 17 to the front wall of the housing, then back to the edge of the baffle, and then again forwardly, from where the coils 36e are laid in a plane slightly inclined along the top of the chamber 19. The ends of this coil are connected with the cold and hot water headers at e—e', respectively.

Air draft or circulation openings 50 are provided through the lower or bottom wall and a dampered inspection port 51 is provided in the front wall.

It will be understood that the outer coil 32 will utilize the heat naturally absorbed by the side walls of the furnace chamber 2 of the heater, and that the rise of this coil need be very slight, if any whatsoever. The rise of the coils 33, 34, 35 and 36 is necessarily greater because they are in actual and constant contact with the blast of the flame, and the hot vapors of combustion as they pass through the heater to the stack 20.

Furnaces or heaters of this kind may be made in various sizes, depending upon the particular requirements and the coils may be arranged in various ways other than shown, but it is preferred that the various coils shall have the back and forth loops in the direct path of travel of the combustible gases as they travel from the burner to the stack connection.

The rise of the coils may be varied according to the use to which the heater is adapted in special cases, whether steam is desired or merely hot water, and also the size of the coils and their length may be varied without departing from the spirit of the invention.

A feature of this construction is found in the fact that if any one series of coils becomes impaired and requires replacement, by removal of the front wall 7, the coil may be withdrawn without interfering with any others.

Having thus described my invention, what I claim as new therein and desire to secure by Letters Patent is—

1. A water heating unit comprising a furnace formed with a combustion chamber designed for an upflow of gases of combustion therein, a water storage tank, a pair of vertical pipe headers with upper and lower ends, respectively, connected in the tank at different levels, a plurality of continuous water circulating pipes, each formed in a plurality of back and forth horizontal loops, disposed at different horizontal levels in the fire box, another continuous pipe formed in a plurality of back and forth loops in vertical planes extending across the back and along the opposite side walls of the combustion chamber; all of said pipes having opposite ends connected to the two headers for natural circulation of heated water.

2. A unit as in claim 1, wherein the furnace has a horizontal baffle wall in its upper portion forming a narrow passage for hot gases of combustion, and wherein one of said pipes is formed with a series of back and forth loops directly in the path of gases passing through said narrow passage.

3. A water heating unit comprising a furnace formed with a combustion chamber designed for an upflow of gases of combustion therein, a horizontal baffle wall in the combustion chamber forming a narrow pasage for the passage of gases from the space below to the space above the baffle, a water storage tank, a pair of vertical pipe headers having upper and lower ends connected in the tank at different levels, a continuous pipe with opposite ends connected to the headers at different levels to facilitate natural circulation and formed in the furnace above the baffle wall with a plurality of back and forth horizontal loops along the top wall, and a plurality of back and forth loops disposed directly above the said narrow passage, other pipes with ends connected respectively with the headers and formed inside the furnace at different horizontal levels with back and forth loops, and a pipe having opposite ends connected with the headers and formed along opposite sides of the furnace and across the back wall thereof with loops for a natural circulation of heated water.

ROY H. ALLEN.